H. A. SPEAR.
VEHICLE LAMP.
APPLICATION FILED APR. 2, 1915.
1,147,344.
Patented July 20, 1915.
2 SHEETS—SHEET 1.
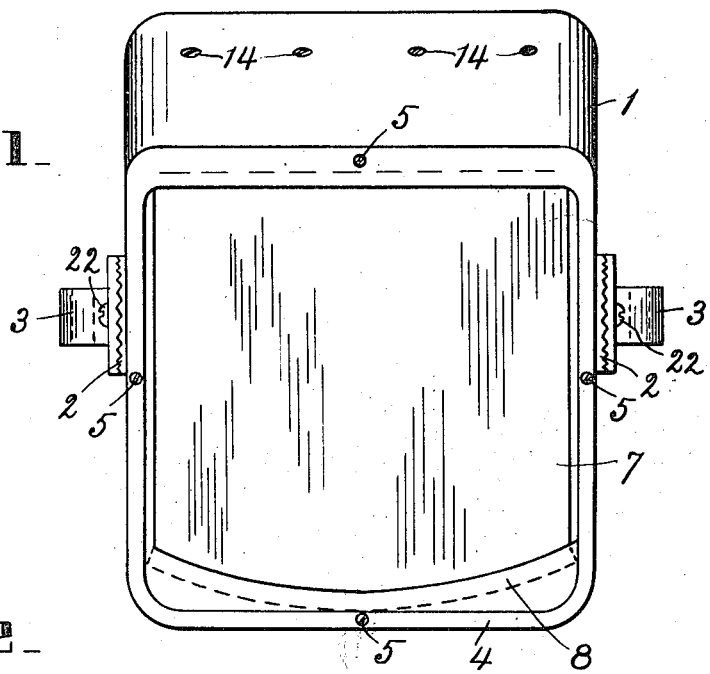
Fig. 1.
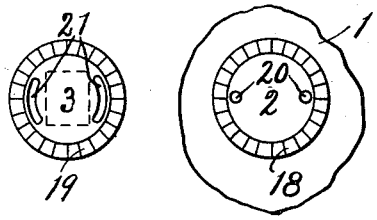
Fig. 2.
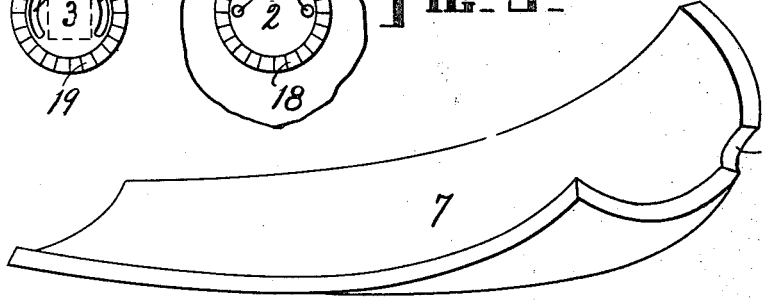
Fig. 3.
Fig. 4.
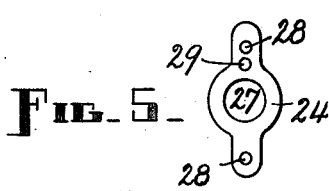
Fig. 5.
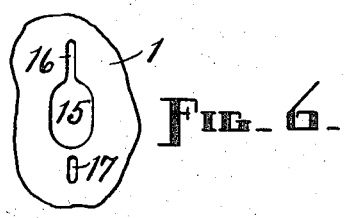
Fig. 6.
WITNESSES:
A. C. Fairbanks
H. D. Cutter.
INVENTOR.
Howard A. Spear,
BY
Frank A. Cutter,
ATTORNEY.

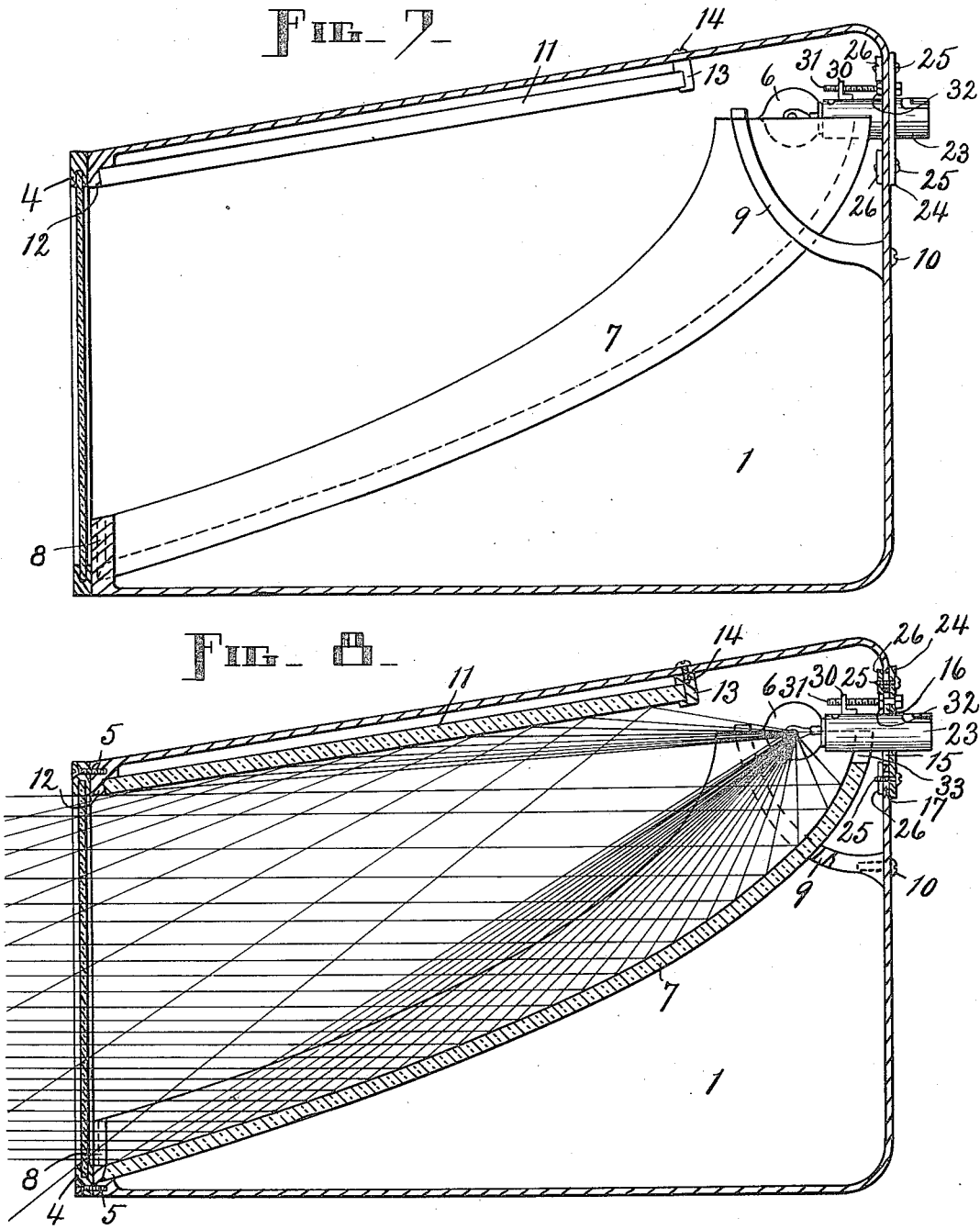

UNITED STATES PATENT OFFICE.

HOWARD A. SPEAR, OF SPRINGFIELD, MASSACHUSETTS, ASSIGNOR OF ONE-HALF TO JOHN W. STACY, OF SPRINGFIELD, MASSACHUSETTS.

VEHICLE-LAMP.

1,147,344.　　　　　Specification of Letters Patent.　　Patented July 20, 1915.

Application filed April 2, 1915. Serial No. 18,722.

*To all whom it may concern:*

Be it known that I, HOWARD A. SPEAR, a citizen of the United States of America, residing at Springfield, in the county of Hampden and State of Massachusetts, have invented a new and useful Vehicle-Lamp, of which the following is a specification.

My invention relates to improvements in lamps for automobiles and other vehicles, and consists of a lamp proper, a certain peculiar reflector which projects the light from such lamp, when the latter is properly positioned relative to said reflector, only in the form of parallel rays, a superimposed plain reflector arranged to project said light in the form of divergent rays directed forwardly and downwardly, the two sets of rays intersecting, and a suitable case or housing, together with such auxiliary and subsidiary parts and members as may be required or desired to make the device as a whole complete and serviceable.

The discomfort and danger arising from the use at night of ordinary lamps on vehicles are well known, and the primary object of my invention is to produce a comparatively simple yet highly efficient lamp, that is capable of lighting the road in front of the vehicle, to which such lamp is attached, to a height that is approximately level with the top of the lamp, and for a sufficient distance in advance of said vehicle, without producing a glare or projecting rays of light above said level, to the end that the aforesaid discomfort and danger are eliminated. It is the glare from light that is above a level of about three feet from the road which causes the trouble. There is no objectionable glare from my lamp when placed in a vehicle at the proper elevation, because there are no upward rays projected therefrom, only forward parallel rays and downward and forward divergent rays massed to form a low-lying powerful shaft in front of the vehicle and with only the needed amount of lateral spread.

A further object of my invention is to provide a lamp of this kind with means for tilting it on an axis at right-angles to the direction of the parallel rays that are projected from said lamp when lighted, so that the elevation of the shaft of light may be raised or lowered at will. Ordinarily the lamp is positioned horizontally, but, in the event said lamp be mounted rather high on a vehicle, it may be necessary or desirable to depress the front end of the lamp, so as to throw the parallel rays, as well as the oblique and divergent rays, downward, and, on the other hand, if the lamp be placed quite low down, it may be found expedient to elevate said front end, so as to obtain a shaft of light having a greater vertical dimension.

Still another object is to provide means for adjusting, to whatever extent may be necessary, the lamp proper, it being an essential requirement, in order to obtain the best and in fact the correct result, that said lamp be positioned at the top of the curved reflector on a level with the upper rear edge of the same, and in the exact center of the space between the ends of such edge.

Other objects and advantages will appear in the course of the following description.

I attain the objects and secure the advantages of my invention by the means illustrated in the accompanying drawings, in which—

Figure 1 is a front end elevation of a lamp which embodies a practical form of my invention; Fig. 2, an inside elevation of one of the clamp sockets for a support or fork by means of which said lamp is attached to a vehicle; Fig. 3, an elevation of the clamp disk with which said socket is used; Fig. 4, a perspective view of the curved reflector; Fig. 5, an elevation of the supporting plate for the lamp socket; Fig. 6, a fragment of the back side of the lamp housing, showing the openings therein for said socket and for the securing and adjusting members for said socket; Fig. 7, an inside elevation of the lamp, as seen when one side of the housing is cut away, and, Fig. 8, a central longitudinal vertical section through said lamp.

Similar numerals designate similar parts through the several views.

The adjustable means for the housing or the lamp as a whole and for the lamp proper, as shown and herein subsequently described, may be varied or changed without departing from the nature of my invention, as may also the securing means for the reflectors, and the shape and size of the housing, it being understood that the scope of said invention is as defined by my claims.

Although various illuminating or lighting mediums may be employed for this lamp, I prefer to use electricity, and have, therefore, shown the device equipped with an incandescent lamp.

In order to avoid confusion in the use of the term lamp, I will hereinafter employ for the lamp proper the term lighting member.

Passing now to the description in detail of the lamp illustrated in the drawings, it will be observed that such lamp comprises a housing 1, which is provided at the sides with fixed serrated clamp disks 2 and adjustable sockets 3, and at the front end with a glazed door 4 held in place by screws 5; a lighting member 6 supported within said housing, from the back end thereof, by means presently to be explained; a curved reflector 7, which is held in place in said housing by a fixed front-end brace 8, in the front end of the housing at the bottom, and a rear clamp 9, the latter being fastened by a screw 10 to said back end of the housing, and, therefore, detachable; and a plane surfaced or flat reflector 11, which is supported above said curved reflector by means of a fixed cleat 12 in the front end of the housing at the top, for the front end of said flat reflector, and a removable cleat 13 on the underside of the top of the housing, for the back end of said flat reflector. The cleat 13 is held in position by means of screws 14.

The housing 1 is generally rectangular in shape, but in the present instance the top of said housing slopes downwardly and forwardly to correspond with the incline which is given the reflector 11 in order to have the rays of light therefrom project at the proper angles. In the vertical center of the back side or rear end of the housing is a wide vertical slot 15 from which a narrow slot 16 extends upward, and a narrow slot 17 below said wide slot, the vertical center of all of said slots being in the same corresponding plane.

Each disk 2 has a ring of teeth 18 on its outside face, and each socket 3 has a similar ring of teeth 19 on its inside face. There are screw holes 20 in each disk 2, and arcuate screw slots 21 in each socket 3, and screws are passed through said slots and holes into the corresponding side of the housing 1, as shown at 22 in Fig. 1, to secure said socket in place against said disk, the engaging teeth 18 and 19 preventing the socket from turning. When, however, the screws 22 are loosened sufficiently to enable the teeth 19 to clear the teeth 18, the sockets and disks can be relatively adjusted, the slots 21 affording ample clearance for said screws. After adjustment the screws 22 are again tightened. The outwardly extending parts or ears of the sockets 3 are designed to fit onto the ends of a forked lamp support such as is in common use, and when said sockets are so mounted they carry the housing 1 which is attached by the disks 2 and the screws 22 to said sockets. Normally the housing is supported by the parts just described in an approximately horizontal position, or with its floor in such position, but any needed deflection from such position may readily be effected through the medium of the same parts and in the manner explained above.

The lighting member 6 is carried horizontally at the inner end of an ordinary double-ended electric lamp and plug socket 23, which latter is received in the slot 15 and projects on both sides of the back end of the housing 1. A plate 24, a pair of screws 25 and a pair of nuts 26 are employed to hold the socket 23 in place vertically. The plate 24 has therein a central opening 27 to receive the socket 23, end openings 28—28 for the screws 25, and an opening 29 between the upper opening 28 and the opening 27. The plate 24, with the socket 23 therein, is placed against the outside of the back of the housing 1, and there held securely by the screws 25 which are passed through the openings 28 and the slots 16 and 17, in said back, into threaded engagement with the nuts 26. The heads of the screws 25, outside of the plate 24, and the nuts 26, inside of the housing back, clamp said plate to said back, but, by loosening said screws, said plate with said socket can be adjusted up or down, owing to the presence of the slots 15, 16 and 17. After adjustment the screws 25 are again tightened. Thus the lighting member 6 can be adjusted vertically to whatever extent may be required to properly locate said member relative to the reflector 7.

Horizontal adjustment of the lighting member is also required, in order that said member shall occupy the proper relation to the reflector 7, and as a means of effecting this adjustment, the socket 23 is provided on top with a lug 30, and a bolt 31 is supplied to engage said lug. The bolt 31 is arranged with its head outside of the plate 24 and its threaded terminal in engagement with the lug 30, while that part of said bolt which is adjacent to said head is received and operates in the plate opening 29 and the housing-back slot 16, said head and a collar 32 on said bolt inside of said back holding the bolt against endwise movement, without preventing the same from being rotated. Upon turning the bolt 31 in either direction, the socket 23 with the member 6 is moved in or out accordingly, through the medium of the lug 30. The bolt 31 moves up or down in the slot 16, when the parts are adjusted vertically.

The reflector 7 is curved both longitudinally and transversely, and it is necessary, if the desired results are to be obtained, that both the major or longitudinal curve and the minor or transverse curve increase in depth as the rear end of said reflector is approached, it being understood that said reflector is placed in an inclined position in the housing 1, with the front end of the reflector on or near to the floor of said housing at the front end thereof. The deepest part of the reflector 7 is, therefore, at the upper rear end, and the curves of such part are quite pronounced as compared with the curves of the shallow front portion. The longitudinal curve of this reflector for more than half of its length back of the front end is quite flat indeed, and the same thing is true in a lesser degree of the transverse curve. With the reflector 7 and the lighting member 6 in proper relative position, the downward rays from said member diverging strike said reflector and are thereby projected forward in parallel relationship, as clearly shown in Fig. 8. To obtain this result the light center of the member 6 must be located in the center of the space, at the top of the reflector 7 at the rear end, outlined by the arc formed by the inner line of the uppermost edge of said reflector and the chord line of such arc. The upper back edge of the reflector 7 is cut out in the center, at 33, to accommodate the socket 23.

The reflector 7 by reason of its shape not only projects the reflected rays from the member 6 in parallel relationship vertically, but in such relationship horizontally as well, so that the shaft of rays reflected by said reflector consists wholly of parallel rays.

The reflector 11 has a downward pitch from back to front, is of substantially the same width as the reflector 7, and is located with its rear edge a little in advance of and above the chord line hereinbefore referred to, and with the bottom of its front edge in the same plane with the uppermost ray reflected from said reflector 7, such ray being a reflection from the rearmost downward ray projected from the member 6 onto said reflector 7. The horizontal parallel reflected rays would be deflected, if any part of the reflector 11 were low enough to intercept them, on the one hand, and, on the other hand, it is desired to locate said reflector so that none of the rays reflected from said reflector will be above the parallel rays or will be intercepted by the reflector 7. The rays projected from the member 6 onto the reflector 11 are reflected divergently downwardly and forwardly, clearing the reflector 7 and at no point intersecting the parallel rays at any appreciable distance beyond the front end of said reflector 11, also as clearly shown in Fig. 8. The rays from the reflector 11 will spread to some extent, as is to be desired in order that a sufficient width of the road shall be illuminated.

The direct or unreflected rays, from the member 6, which escape from the housing 1, commingle with the reflected rays from the two reflectors, while the rays projected upwardly from said member, behind the reflector 11 and into the upper back part of said housing are lost, there being no reflecting surface to project them outwardly.

It is now clearly to be seen that this lamp gives forth a powerful shaft of light the top of which is level with the top of the glazed opening in the door 4, and which from that elevation extends downward to the road, spreading laterally to the desired degree, and being of a length that is entirely adequate for purposes of safety and convenience. It is also clear that such shaft of light has in it no upwardly directed rays. The shaft of light may as a whole be inclined upwardly or downwardly by readjusting the housing 1 on its support, in the manner previously explained.

The results produced by this lamp are due to the peculiar convexity of the curved reflector, and to the particular arrangement, independently and relatively, of the two reflectors and the lighting member.

What I claim as my invention, and desire to secure by Letters Patent, is—

1. A vehicle lamp comprising a housing, a curved reflector arranged at an incline in said housing, and having, substantially as shown a varying double concavity which is deep in the upper rear end portion of said reflector, and comparatively shallow forward of such end portion, the forward portion of said reflector, in its longitudinal direction, being approximately straight, a plane reflector in said housing over said curved reflector, but in advance of the foremost vertical plane of the top edge thereof, and a lighting member in said housing at the top of said curved reflector, and in front of the central part of said top edge.

2. A vehicle lamp comprising a housing, a curved reflector arranged at an incline in said housing, and having substantially as shown, a varying double concavity which is deep in the upper rear end portion of said reflector, and comparatively shallow forward of such end portion, the forward portion of said reflector, in its longitudinal direction, being approximately straight, a plane reflector in said housing over said curved reflector, but in advance of the foremost vertical plane of the arcuate top edge thereof, and a lighting member in said housing at the top of said curved reflector, said member being located in the center of the space partially defined by said arcuate edge.

3. A vehicle lamp comprising a housing, a curved reflector arranged at an incline in said housing, and having, substantially as shown, a varying double concavity which is deep in the upper rear end portion of said reflector, and comparatively shallow forward of such end portion, the forward portion of said reflector, in its longitudinal direction, being approximately straight, a lighting member in said housing at the top of said reflector and in front of the central part of the upper edge thereof, said reflector and lighting member being so constructed and arranged that the former reflects light, projected from the latter thereon, in approximately parallel rays only, and a plane reflector also arranged at an incline in said housing, over said curved reflector, said plane reflector being so located, relative to said lighting member, as to avoid reflecting light therefrom onto said curved reflector, and having its front end approximately on a level with the uppermost rays of light projected from said curved reflector.

4. In a vehicle lamp, a reflector which is curved longitudinally, with an increasing concavity as one end of said reflector is approached, and which is curved transversely, also with an increasing concavity as the aforesaid end is approached, said end being directed upwardly, a plane reflector, and a horizontal lighting member located behind and below the rear end of said plane reflector, and over said first-mentioned reflector at said upwardly-directed end, the upper edge of said end being centrally recessed to receive said lighting member.

5. A vehicle lamp comprising a housing, a curved reflector arranged at an incline in said housing, and having, substantially as shown, a varying double concavity which is deep in the upper rear end portion of said reflector, and comparatively shallow forward of such end portion, the forward portion of said reflector, in its longitudinal direction, being approximately straight, a lighting member in said housing at the top of said reflector and in front of the central part of the upper edge thereof, said reflector and lighting member being so constructed and arranged that the former reflects light, projected from the latter thereon, in approximately parallel rays only, and a plane reflector of approximately the same width as said curved reflector, and arranged at an incline in said housing, over said curved reflector, but in advance of the foremost vertical plane of the aforesaid upper edge, said plane reflector being so located, relative to said lighting member, as to avoid reflecting light rays therefrom onto said curved reflector, and having its front end approximately on a level with the uppermost rays of light projected from said curved reflector.

HOWARD A. SPEAR.

Witnesses:
F. A. CUTTER,
A. C. FAIRBANKS.